Aug. 28, 1962 D. V. RIDGEWAY 3,051,861
COLOUR TELEVISION APPARATUS
Filed April 16, 1959 3 Sheets-Sheet 1

Inventor
D. V. Ridgeway
By Holcombe, Wetherill & Brisebois
Attorneys

Aug. 28, 1962 D. V. RIDGEWAY 3,051,861

COLOUR TELEVISION APPARATUS

Filed April 16, 1959 3 Sheets-Sheet 2

Inventor
D. V. Ridgeway
By Holcombe, Wetherill & Brisebois
Attorneys

Inventor
D.V. Ridgeway
By Holcombe, Wetherill & Brisebois
Attorneys 3,051,861
COLOUR TELEVISION APPARATUS
Denis Victor Ridgeway, Cambridge, England, assignor to Pye Limited, Cambridge, England, a British company
Filed Apr. 16, 1959, Ser. No. 806,799
Claims priority, application Great Britain Apr. 24, 1957
15 Claims. (Cl. 313—65)

Figure 1:
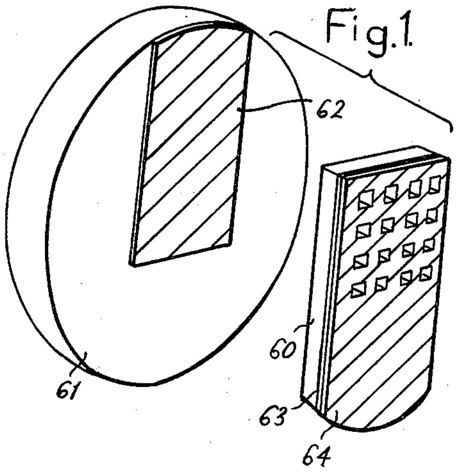

The present invention relates to colour television apparatus and is a continuation in part of application Serial No. 729,570. That specification describes a television camera incorporating a pick-up tube which produces signals corresponding to two of the three primary colour components of the object, namely of the red and green components, the signal corresponding to the third colour component, namely blue, being derived from a separate pick-up tube.

The present invention provides an improved construction and method of constructing the target of a two colour pick-up tube as described in the aforesaid specification and also further developments thereof which enable three-colour tubes to be constructed.

According to this invention, the target consists of a transparent support comprising a transparent imperforate sheet, preferably of glass, having a transparent perforate thin sheet, also preferably of glass, assembled thereto over the target area of the support, said perforate sheet having a large number of perforations distributed over the target area, wherein a signal plate of transparent conducting material and a light filter are applied on to one or both of the surfaces of the perforate sheet, and a second signal plate of transparent conducting material is applied to the surface of the imperforate sheet to cover at least those areas thereof which are in optical register with the perforations when the imperforate and perforate sheets are assembled together. A photo-sensitive material covers the target area so as to be illuminated by light from the object which passes through the signal plates. This photo-sensitive material may comprise a photo-conductive layer which is applied over the target in contact with both signal plates. Alternatively the photo-sensitive material may comprise a photo-emissive material which is applied as a mosaic over the target area, the discrete elements of the mosaic being applied on insulating material interposed between the photo-emissive material and the opposing signal plate.

The perforate sheet may have the perforations therein in the form of parallel slots. Alternatively the perforations may be distributed over the target area in the form of a grid.

In extending the invention to the construction of three colour camera tubes, a second perforate sheet of thin transparent glass is assembled over the exposed surface of the first perforate sheet, the perforations in the second sheet being in register with but larger than the perforations in the first perforate sheet. A second colour filter and transparent signal plate are applied on one or both surfaces of the second perforate sheet, the photo-sensitive material being finally applied over the target area in the manner above described.

The colour filters applied to the two perforate sheets are selected to produce colour subtraction between the various signal plates and the output signals from the three signal plates are electrically subtractively mixed to produce signal outputs corresponding to the three individual primary colour components. Thus, for example, a minus blue filter is associated with the first perforate signal plate to produce combined red and green signals at the associated signal plate, and the second perforate sheet is provided with a magenta or red filter to produce a red signal output at the associated signal plate. By electrically subtracting the red signal from the combined red and green signal, the green signal component can be separated, and by subtracting the combined red and green signal from the black and white signal produced at the signal plate associated with the imperforate sheet, the tube component signal can be separated.

The invention therefore also consists in a colour television camera which includes a camera tube operating on a subtractive basis and in which the colour analysis is made by focussing light from the object on to three sets of photo-sensitive areas distributed over the target in different planes, the areas being contiguous when viewed in the direction of the incident light and being accessible to a common electron scanning beam, each set of areas being associated with its own transparent conducting signal plate, the sets of area in different planes having interposed colour filters so that the light falling on the photo-sensitive areas in the second plane will pass through a first subtractive filter and light falling on the photo-sensitive areas in the third plane will pass through said first subtractive filter and a second subtractive filter whereby to determine the spectral response of the photo-sensitive areas in the different planes, and an electric circuit for subtractively mixing the output signals from the different signal plates to produce outputs corresponding to the three primary colour components of the object.

Figure 2:
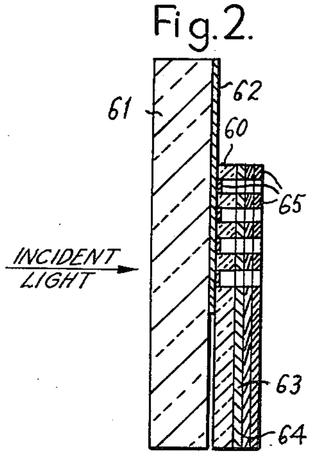
Figures 3, 4, 5:
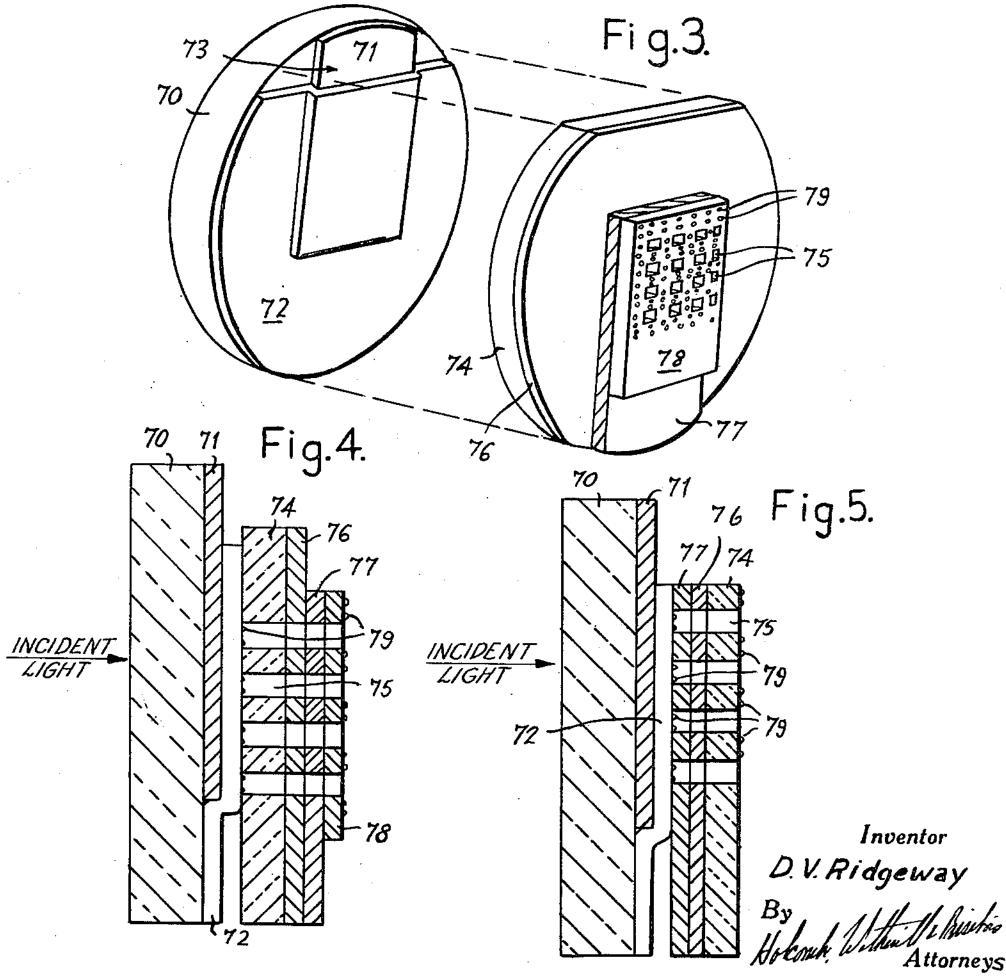
Figure 6:
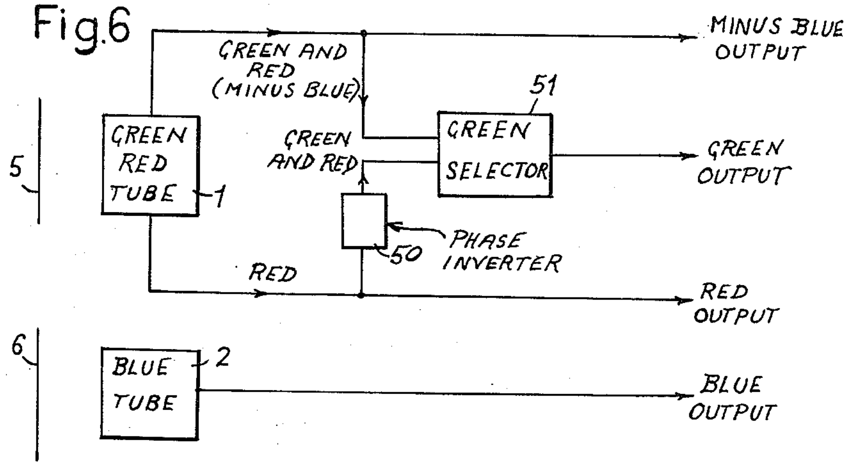
Figure 7:
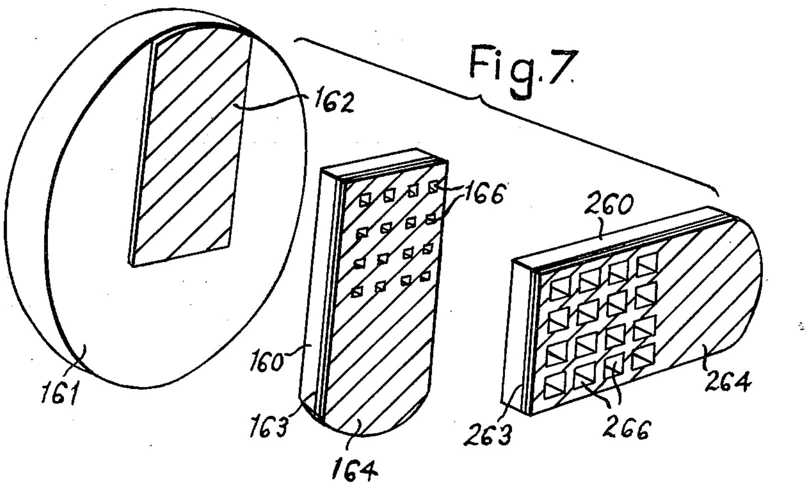
Figure 8:
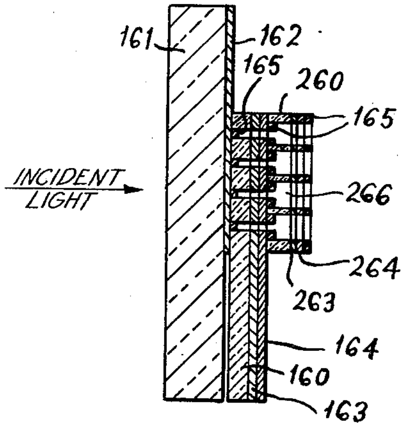
Figure 9:
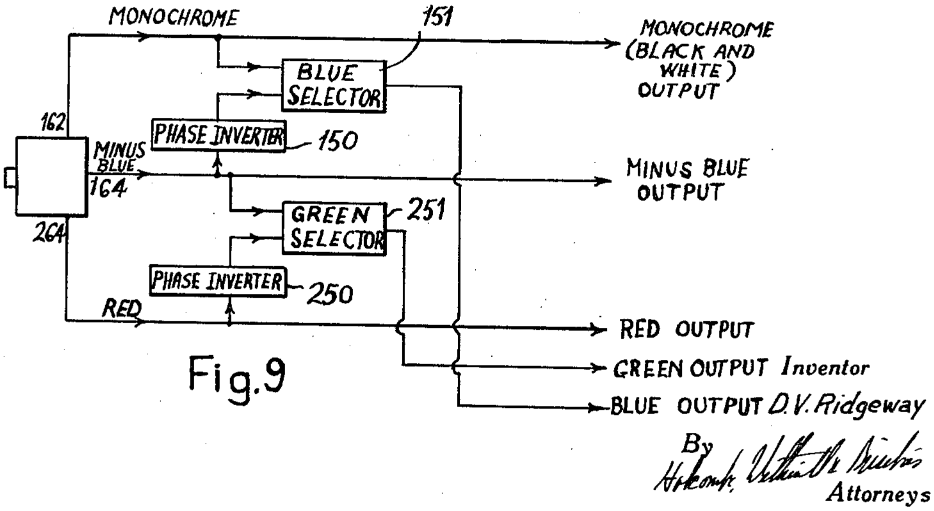

In order that the invention may be more clearly understood, reference will now be made to the accompanying drawings, in which:

FIGURE 1 is an exploded perspective view showing a construction of the target assembly for a photo-conductive pick-up tube, FIGURE 2 is a section of the target assembly of FIGURE 1, FIGURE 3 is an exploded perspective view of the elements of a target assembly for an orthicon type pick-up tube, FIGURE 4 is a section through the assembly shown in FIGURE 3, FIGURE 5 is a section through a modified target assembled for an orthicon type tube, FIGURE 6 is a circuit diagram, FIGURE 7 is an exploded perspective view showing the target assembly for a three colour photo-conductive pick-up tube, FIGURE 8 is a section of the target assembly of FIGURE 7, FIGURE 9 is a circuit diagram.

The target assembly to be described with reference to FIGURES 1 and 2 is suitable for incorporation in a photo-conductive pick-up tube as described in co-pending application Serial No. 729,570 for producing signals corresponding to the red and green components of the object. The blue component is removed from the light impinging on the tube by a minus blue filter positioned in front thereof as described in the aforesaid application.

According to this invention the transparent filter support is assembled from at least two superimposed glass plates, one of which is imperforate and the other (or others) of which is very thin and is etched right through to form a series of perforations distributed over the target area. A light filter layer is applied over the surface of the perforate plate. The perforate plate is secured on the imperforate plate to form the support with the surface areas for the signal plates in different planes. One signal plate may be deposited on the surface of the imperforate glass plate before the perforated glass plate is assembled thereto. The light filter layer and the signal plate may be applied to the surface of the perforated glass plate either before or after it is assembled to the imperforate glass plate.

The perforations may be in the form of slots, separated by strips of glass connected together at one or both ends. Preferably, however, in order to strengthen the very fragile glass strips of the perforated glass plate, they are joined together at intermediate points along their length by cross strips of glass to form a glass mesh. The perforations may be rectangular, circular, triangular or of any other desired shape.

For the manufacture of the perforated glass plate, use is made of a photo-sensitive glass known under the trade name "Fotoform" which is manufactured by Corning Glass Works, of Corning, New York, United States of America. As described in an article entitled "Chemical Machining Photosensitive Glass" by Marshall Byer in the June 1956 issue of "Materials and Methods," the photosensitive glass has the property of crystallising when exposed to ultra-violet light and subsequent heat treatment, and the crystallised portion is more rapidly attacked by the etching fluid than any unexposed non-crystalline portion. To produce the perforated plate required in the pick-up tube, a thin plate of photo-sensitive glass is exposed to ultra-violet light through a mesh and is then heat treated and etched to produce a perforated plate as shown at 60 in FIGURES 1 and 2. The perforated plate 60 is ground to a thickness of about .002" or less and is assembled to an imperforate glass disc 61 (which may be the glass end wall of the tube) on the target part of the surface of which has already been applied a signal plate 62. On the opposite surface of the plate 60 (preferably before assembly) is applied to a magenta or red filter layer 63 and a second signal plate 64. The whole surface of the filter assembly is then covered with the layer 65 of photo-conductive material.

As will be apparent from FIGURE 2, incident light having passed through the external minus blue filter will produce signals corresponding to both red and green components at the signal plate 62, and after passing through the magenta or red filter 63 will produce red component signals at the signal plate 64.

By means of an electronic circuit, the red signal is electrically subtracted from the combined red and green signal (with if necessary attenuation of one or other signal so as to achieve the right proportions) so that only the green signal will remain. Thus separate red and green outputs can be obtained. A block circuit diagram for such an arrangement is shown in FIGURE 6. The red output signal from the red/green tube 1 is fed through a phase inverter 50 to a mixer 51, constituting a green selector, to which the combined green and red output signal from the red/green tube 1 is also fed, without phase inversion. The two sets of signals are mixed in the mixer 51 whereby the signals corresponding to the red component will cancel each other and only the signals corresponding to the green component will be present in the output from the mixer 51.

It will be clear from FIGURE 6 that when the camera incorporates a separate "blue" tube 2 as described in application Serial No. 729,570 the arrangement provides not only "red," "green" and "blue" component signal outputs, but also a "minus blue" signal output. By combining the "blue" and "minus blue" outputs in suitable proportions, a "black and white" signal is available if required.

The arrangement of FIGURE 6 leads to further possibilities. Thus by mixing the "green" output in antiphase with the "minus blue" output, the red component of the combined red/green signal may be separated and mixed with the other red signal from the tube to increase the red signal output.

Similar methods of construction may be applied in the construction of an orthicon type tube as will now be described with reference to FIGURES 3 and 4.

In this embodiment the glass disc 70, which may be the glass end wall of the tube, is provided with a transparent conductive signal plate 71, partially covered by a transparent insulating layer 72, a part 73 of the signal plate being left uncovered for making electrical connection thereto. The insulating layer 72 may be a thin glass sheet. A thin plate 74 of photo-sensitive glass, for example two thousandths of an inch thick, is provided with a perforated area substantially equal to the area to be scanned by the electron beam. The perforations 75 are preferably rectangular, and are spaced and dimensioned to provide parallel rows of perforations over the whole target area, there being at least one recess and one glass strip per picture element. The perforated plate 74 is provided with a filter 76, which may be a magenta filter as described in application Serial No. 729,570. A second transparent conducting signal plate 77 is then deposited over the area of the plate 74 to be scanned by the electron beam with an additional extension beyond this area for connection purposes, and without deposition on the side walls of the perforations 75. A transparent insulating layer 78 is then applied over at least the area of the signal plate 77. The plate 74 and the glass disc 70 are then assembled together in any suitable manner, and a target mosaic of photo-emissive material 79 is applied over the entire area of the assembly to be scanned by the electron beam, i.e. on the surface of the insulating layer 78 surrounding the perforations 75 and on the areas of the insulating layer 72 exposed by the perforation 75. The photo-emissive material 79 may be applied through a finer mesh to form discrete areas of the mosaic.

The tube described operates on the orthicon principle, combined red and green component signals being derived from the signal plate 71 and the red component signal from the signal plate 77.

In order to avoid unnecessary capacity between the two signal plates 71 and 77, which would result in increased "cross-talk" between them, the areas of the signal plates are limited, as shown in FIGURE 3 so that the overlapping area is restricted to the absolute minimum. The capacity between the two signal plates may be further reduced by forming the signal plate 71, instead of as a continuous areas, as interconnected parallel strips aligned behind the individual rows of perforations. These strips may be formed before the disc 70 and plate 74 are joined together by using the perforated plate 74 as a mask through which the conducting material is evaporated on to the disc 70. After a first evaporation the mask is displaced and the conducting material is again evaporated thereon to coat the areas on the disc 70 between the previously coated areas thereon so as to join them together as strips. The strips are then electrically joined together at one end for connection purposes. The conducting material which is evaporated on to the perforated plate when being used as a mask, forms the signal plate 77.

Various modifications of the embodiment just described are possible. For example, the perforations 75 may be of a shape other than rectangular and may be arranged in other than vertical rows. Further, if the material used for the light filter layer is sufficiently insulating, it may be used in substitution for the insulating layer 78, by applying it between the signal plate 77 and the photo-emissive material 79. In another modification, the perforated plate 74 may itself constitute the insulating capacity layer between the photo-emissive material and the signal plate 77. In this modification, as shown in FIGURE 5, after the second signal plate 77 and the filter 76 have been applied to the perforated plate 74, the plate 74 is assembled to the disc 70 with the signal plate 77 facing towards the disc 70, and the photo-emissive material 79 is then applied.

FIGURES 7 and 8 illustrate an embodiment of a three-colour photo-conductive pick-up tube according to this invention. As in the embodiment described with reference to FIGURES 1 and 2 the assembly comprises an imperforate glass disc 161 on the target part of the surface of which is applied a transparent conducting signal plate 162, and a perforate glass plate 160 on which is applied a filter layer 163 and a second signal plate 164. Additionally there is assembled in front of the signal plate 164 a second perforate glass plate 260 on which is applied a light filter 263 and a third signal plate 264. The perforations 266 in the perforate plate 260 are disposed according to the same pattern as the perforations 166 in the plate 160 but are larger than the perforations 166 so that when the plates are assembled the two sets of perforations will be in register but a part of the signal plate 164 immediately surrounding each of the perforations 166 will be exposed through the larger perforations 266. Areas of the signal plate 162 are exposed through the perforations 166.

As shown in FIGURE 8, the photo-conductive material 165 is applied over the target area in contact with the exposed areas of the three-signal plates 162, 164 and 264.

With a three-colour pick-up tube having a target as described there is no external minus blue filter but the light filter 163 is minus blue. The light filter 263 is a minus green (magenta) filter or a red filter. Thus there is produced at the signal plate 162 signals of a black and white or mono-chrome image, at the signal plate 164 there are produced signals corresponding to the red and green components combined together, and at the signal plate 264 signals corresponding to the red component above.

By electrically subtracting the signals produced at the different signal plates from one another with the circuit arrangement shown in FIGURE 9, separate signal outputs corresponding to the three primary colour components red, green and blue can be derived. As shown in FIGURE 9, the minus blue signal from the signal plate 164, after phase inversion in the inverter 150, is fed to a mixer 151, constituting a blue selector to which the monochrome signal from the signal plate 162 is also fed without phase inversion. In the mixer 151 the signals corresponding to the red and green components will cancel each other and only the signals corresponding to the blue component will be present in the output from the mixer 151. In a similar way the signals corresponding to the green component are derived from the mixer 251 to which the red signal from the signal plate 264 is fed through the phase inverter 250 and the minus blue signal from the signal plate 164 is fed without phase inversion. The red signal output is derived direct from the signal plate 264. As will be apparent from FIGURE 9 there is also available a mono-chrome output and a minus blue output.

The arrangement of FIGURE 9 may be modified to increase the output of any of the component signals in the manner described with reference to FIGURE 6.

Whilst particular embodiments have been described it will be understood that various modifications may be made without departing from the scope of the invention.

Thus the selection of the filters may be changed in various ways. For example, with a minus blue for the first filter, the second filter can be a minus red filter (cyan) for providing a green signal from the signal plate 264. When this signal is subtracted from the output from the signal plate 164, a red signal is made available. Other pairs of filters may be used in order to obtain three suitable outputs. For example, the first filter instead of being a minus blue filter may be a minus red (cyan) filter in which case the second filter can be either minus blue (yellow) or green; or alternatively minus green (magenta) or blue. As another example, the first filter can be a minus green (magenta) filter in which case the second filter can be either minus blue (yellow) or red; or alternatively minus red (cyan) or blue.

I claim:

1. A target for a television pick-up tube consisting of a transparent support comprising a transparent imperforate sheet having a transparent perforate thin sheet assembled thereto over the target area of the support, said perforate sheet having a large number of perforations distributed over the target area, a first signal plate of transparent conducting material and a light filter mounted on at least one surface of said perforate sheet, and a second signal plate of transparent conducting material mounted on one surface of the imperforate sheet to cover at least those areas thereof which are in optical register with the perforations, and a photo-sensitive material covering the target area so as to be illuminated by light from an object which light passes through the signal plates.

2. Apparatus according to claim 1, in which the perforations comprise parallel slots.

3. Apparatus according to claim 1, in which the photo-sensitive material comprises a photo-conductive layer applied over the target area in contact with the first and second signal plates.

4. Apparatus according to claim 1, in which the photo-sensitive material comprises a photo-emissive material applied as a mosaic over the target area, the discrete elements of the mosaic being insulated from the opposing signal plate.

5. A target for a television pick-up tube consisting of a transparent support comprising a transparent imperforate glass sheet having a transparent perforate thin glass sheet assembled thereto over the target area of the support, said perforate sheet having a large number of perforations distributed over the target area in the form of a grid, a first signal plate of transparent conducting material and a light filter mounted on at least one surface of said perforate sheet, and a second signal plate of transparent conducting material mounted on the surface of the imperforate sheet to cover at least those areas thereof which are in optical register with the perforations, and a photo-sensitive material covering the target area so as to be illuminated by light from an object which light passes through the signal plates.

6. Apparatus according to claim 4, in which said photo-sensitive material comprises a photo-conductive layer applied over the target area in contact with both signal plates.

7. Apparatus according to claim 4, in which the photo-sensitive material comprises a photo-emissive material applied as a mosaic over the target area, the discrete elements of the mosaic being insulated from the opposing signal plate.

8. A target for a television pick-up tube consisting of a transparent support comprising a transparent imperforate sheet, having a first transparent perforate thin sheet assembled thereto over the target area of the support, said first perforate sheet having a large number of perforations distributed over the target area, a second transparent perforate thin sheet being assembled over the exposed surface of the first perforate sheet, the perforations in said second sheet being in register with but larger than the perforations in the first perforate sheet, a first signal plate of transparent conducting material and a light filter mounted on at least one of the surfaces of said first perforate sheet, a second signal plate of transparent conducting material and a light filter mounted on at least one of the surfaces of the second perforate sheet, and a third signal plate of transparent conducting material mounted on the surface of the imperforate sheet to cover at least those areas thereof which are in optical register with the perforations in the first perforate sheet, and a photo-sensitive material covering the target area so as to be illuminated by light from an object which light passes through the signal plates.

9. A target for a television pick-up tube including a transparent imperforate glass sheet support, a first transparent perforate thin glass sheet having a plurality of perforations distributed thereover in the form of a grid, means assembling said first perforate sheet over the target area, a second transparent perforate thin glass sheet having a plurality of perforations distributed thereover in the form of a grid, each perforation in said second perforate sheet having a larger cross-sectional area than a perforation in said first perforate sheet, means assembling said second perforate sheet over the exposed surface of the first perforate sheet with the perforations in said second perforate sheet in register with the perforations in said first perforate sheet, a first signal plate of transparent conducting material and a light filter mounted on at least one surface of said first perforate sheet, a second signal plate of transparent conducting material and a light filter mounted on at least one surface of the second perforate sheet, a third signal plate of transparent conducting material mounted on the surface of the imperforate sheet to cover the areas thereof in optical register with the perforations in the first perforate sheet, and a photo-sensitive material covering the target area so that said photo-sensitive material will be illuminated by light from an object which light passes through the signal plates.

10. Apparatus according to claim 9, in which the photo-sensitive material comprises a photo-conductive layer in contact with said first, second and third signal plates.

11. Apparatus according to claim 9, in which the photo-sensitive material comprises a photo-emissive material in the form of a mosaic extending over the first, second and third signal plates, the discrete elements of the mosaic being insulated from their opposing signal plates.

12. A television camera including a camera tube operating on a subtractive basis and in which the colour analysis is made by focussing light from the object on to three sets of photo-sensitive areas distributed over the target in different planes, the areas being contiguous when viewed in the direction of the incident light and being accessible to a common electron scanning beam, each set of areas being associated with its own transparent conducting signal plate, the sets of areas in different planes having interposed colour filters so that the light falling on the photo-sensitive areas in the second plane will pass through a first subtractive filter and light falling on the photo-sensitive areas in the third plane will pass through said first subtractive filter and a second subtractive filter thereby to determine the spectral response of the photo-sensitive areas in the different planes, and an electric circuit for subtractively mixing the output signals from the different signal plates to produce outputs corresponding to the three primary colour components of the object.

13. A camera according to claim 12, in which said first subtractive filter is a minus blue filter.

14. A camera according to claim 13, in which said second subtractive filter is a magenta filter.

15. A light filter for a colour television tube comprising a transparent imperforate sheet having a transparent perforate thin sheet assembled thereto, a light modifying filter applied over the surface of the perforate sheet, and a layer of transparent conducting material extending over a surface of at least one of said sheets.

References Cited in the file of this patent

UNITED STATES PATENTS

| | | |
|---|---|---|
| 2,861,207 | Smith | Nov. 18, 1958 |
| 2,873,189 | Evans | Feb. 10, 1959 |
| 2,892,123 | Sunstein | June 23, 1959 |

FOREIGN PATENTS

| | | |
|---|---|---|
| 752,871 | Great Britain | July 18, 1956 |